(12) United States Patent
Babaev

(10) Patent No.: US 11,802,426 B1
(45) Date of Patent: Oct. 31, 2023

(54) SYSTEMS AND METHODS FOR AN IDENTIFICATION PANEL TO MEASURE HAND STATIC AND/OR DYNAMIC CHARACTERISTICS

(71) Applicant: Woven by Toyota, U.S., Inc., Palo Alto, CA (US)

(72) Inventor: Islam Babaev, Mountain View, CA (US)

(73) Assignee: WOVEN BY TOYOTA, U.S., INC., Palo Alto, CA (US)

( * ) Notice: Subject to any disclaimer, the term of this patent is extended or adjusted under 35 U.S.C. 154(b) by 0 days.

(21) Appl. No.: 17/724,775

(22) Filed: Apr. 20, 2022

(51) Int. Cl.
E05B 81/76 (2014.01)
G06V 40/13 (2022.01)
B60R 25/25 (2013.01)
B60R 25/01 (2013.01)
G06V 40/12 (2022.01)

(52) U.S. Cl.
CPC .............. *E05B 81/77* (2013.01); *B60R 25/01* (2013.01); *B60R 25/252* (2013.01); *G06V 40/1365* (2022.01)

(58) Field of Classification Search
CPC ..... E05B 81/77; G06V 40/1365; B60R 25/01; B60R 25/252
See application file for complete search history.

(56) References Cited

U.S. PATENT DOCUMENTS

| | | | |
|---|---|---|---|
| 6,069,970 A | 5/2000 | Salatino et al. | |
| 7,102,507 B1 | 9/2006 | Lauren | |
| 7,171,026 B2 | 1/2007 | Shinada et al. | |
| 8,881,347 B2 | 11/2014 | Feinstein | |
| 9,290,201 B1 * | 3/2016 | Lombrozo | B62D 6/10 |
| 9,460,575 B2 * | 10/2016 | Park | G06F 21/32 |
| 10,074,001 B2 * | 9/2018 | Homer | G07C 9/37 |
| 10,173,667 B2 * | 1/2019 | Chan | A61B 7/04 |
| 10,229,309 B2 | 3/2019 | Unveren et al. | |
| 10,316,966 B2 * | 6/2019 | Farges | F16H 59/0278 |
| 10,562,529 B2 | 2/2020 | Moulene | |
| 10,846,391 B1 * | 11/2020 | Bonney | G06V 40/16 |
| 10,920,462 B2 * | 2/2021 | Guerin | E05B 85/16 |
| 10,967,837 B1 * | 4/2021 | Schulz | B60R 25/1001 |
| 2010/0109838 A1 * | 5/2010 | Fisher | G07C 9/37 340/5.83 |

(Continued)

FOREIGN PATENT DOCUMENTS

CN 208686236 U 4/2019

*Primary Examiner* — Thomas D Alunkal
(74) *Attorney, Agent, or Firm* — Christopher G. Darrow; Darrow Mustafa PC

(57) ABSTRACT

Systems, methods, and other embodiments described herein relate to controlling access to an interior of an object by way of static and/or dynamic characteristics of a hand of a user. In an embodiment, a method includes obtain first measurements that are based upon contact of the hand with a handle located on an exterior of an object over a first time period as the hand applies first force to the handle. The method includes identify the user as being authorized to access an interior of the object based upon the first measurements and second measurements, where the second measurements are based upon contact of the hand with the handle over a second time period as the hand applies second force to the handle. The method includes grant the user access to the interior of the object based on the user being authorized.

20 Claims, 10 Drawing Sheets

(56) References Cited

U.S. PATENT DOCUMENTS

| | | |
|---|---|---|
| 2011/0187862 A1 | 8/2011 | Ishikawa |
| 2012/0109418 A1 | 5/2012 | Lorber |
| 2016/0264131 A1 | 9/2016 | Chan et al. |
| 2018/0196988 A1* | 7/2018 | Tse .......................... G06F 21/32 |
| 2019/0119958 A1* | 4/2019 | Gerber .................... E05B 85/16 |
| 2020/0308883 A1* | 10/2020 | Bresser ................... E05B 81/90 |

* cited by examiner

SYSTEMS AND METHODS FOR AN IDENTIFICATION PANEL TO MEASURE HAND STATIC AND/OR DYNAMIC CHARACTERISTICS

TECHNICAL FIELD

The subject matter described herein relates, in general, to granting a user access to an area based upon static characteristics and/or dynamic characteristics that are proprioception-related, and, more particularly, to measuring static characteristics and/or dynamic characteristics of a hand of a user in order to determine whether to grant the user access to a cabin of a vehicle.

BACKGROUND

Vehicle anti-theft protection is a significant focus of security research due to the emergence of wireless and keyless access technologies. For instance, an asymmetric cryptographic key transmitted via Bluetooth® can be stolen by a hacker through intervention into a radio channel. While some wireless access systems may utilize near field communication (NFC) which increases security and trust, keys can still be stolen and used by a hacker. Conventional keyless access systems for preventing vehicle theft may use fingerprint and/or facial recognition. However, such conventional keyless access systems may be compromised if a hacker has access to fingerprint scans and/or facial scans of an authorized user.

SUMMARY

Example systems and methods relating to a manner of improving access to an interior of an object, such as a cabin of a vehicle, by measuring static characteristics and/or dynamic characteristics of a hand of a user are described herein. In one embodiment, during a first time period, a system obtains first measurements of static characteristics and/or dynamic characteristics of a hand of a user using sensors (e.g., piezoelectric sensors) as the hand of the user applies force to a handle on an exterior of the object (e.g., a handle on a door of a vehicle). The sensors may be located on or integrated into the handle. Static characteristics of the hand generally do not change over the first time period and may include a shape of the hand, an orientation of the hand on the handle, a position of the hand on the handle, and/or a gripping load distributed across the handle. Dynamic characteristics of the hand may change over the first time period and may include angles {01116479} 1 at which the handle is pulled by the hand of the user over the first time period, gripping pressures applied to different regions of the handle by different parts of the hand (e.g., different fingers, palm, etc.) over the first time period, pulling forces applied to different regions of the handle by the different parts of the hand over the first time period, and/or overall pulling forces applied to the handle by the hand over the first time period. The system identifies the user as being authorized to access the interior of the object based upon the first measurements of the static and/or dynamic characteristics and a stored profile, where the stored profile comprises second measurements of the static and/or dynamic characteristics of the hand generated during a second time period occurring prior to the first time period. In an example, the system trains a machine learning model based upon the second measurements and provides the first measurements as input to the machine learning model, where the machine learning model outputs a value based upon learned parameters of the machine learning model and the first measurements, where the value is indicative of whether or not the user is authorized to access the interior of the object. The value may be either a True/False Boolean variable or a confidence rate. The system grants the user access to the interior of the object based on the user being authorized. For instance, the system may unlock a door of a vehicle upon identifying that that the user is authorized to access the vehicle or if the confidence rate is above predefined threshold.

In one embodiment, a system for controlling access to an interior of an object is disclosed. The system includes a processor and a memory communicably coupled to the processor. The memory stores instructions that when executed by the processor cause the processor to obtain first measurements that are based upon contact of a hand of a user with a handle located on an exterior of the object over a first time period as the hand applies first force to the handle. The instructions further cause the processor to identify the user as being authorized to access the interior of the object based upon the first measurements and a profile for the handle, wherein the profile comprises second measurements that are based upon contact of the hand of the user with the handle over a second time period as the hand applies second force to the handle, wherein the second time period occurs prior to the first time period. The instructions additionally cause the processor to grant the user access to the interior of the object based on the user being authorized.

In one embodiment, a non-transitory computer-readable medium for controlling access to an interior of an object and including instructions that when executed by a processor cause the processor to perform one or more functions is disclosed. The instructions cause the processor to obtain first measurements that are based upon contact of a hand of a user with a handle located on an exterior of the object over a first time period as the hand applies first force to the handle. The instructions further cause the processor to identify the user as being authorized to access the interior of the object based upon the first measurements and a profile for the user, wherein the profile comprises second measurements that are based upon contact of the hand of the user with the handle over a second time period as the hand applies second force to the handle, wherein the second time period occurs prior to the first time period. The instructions additionally cause the processor to grant the user access to the interior of the object based on the user being authorized.

In one embodiment, a method for controlling access to an interior of an object is disclosed. In one embodiment, the method includes obtain first measurements that are based upon contact of a hand of a user with a handle located on an exterior of an object over a first time period as the hand applies first force to the handle. The method further identify the user as being authorized to access an interior of the object based upon the first measurements and second measurements, wherein the second measurements are based upon contact of the hand of the user with the handle over a second time period as the hand applies second force to the handle, wherein the second time period occurs prior to the first time period. The method also includes grant the user access to the interior of the object based on the user being authorized.

BRIEF DESCRIPTION OF THE DRAWINGS

The accompanying drawings, which are incorporated in and constitute a part of the specification, illustrate various systems, methods, and other embodiments of the disclosure.

It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
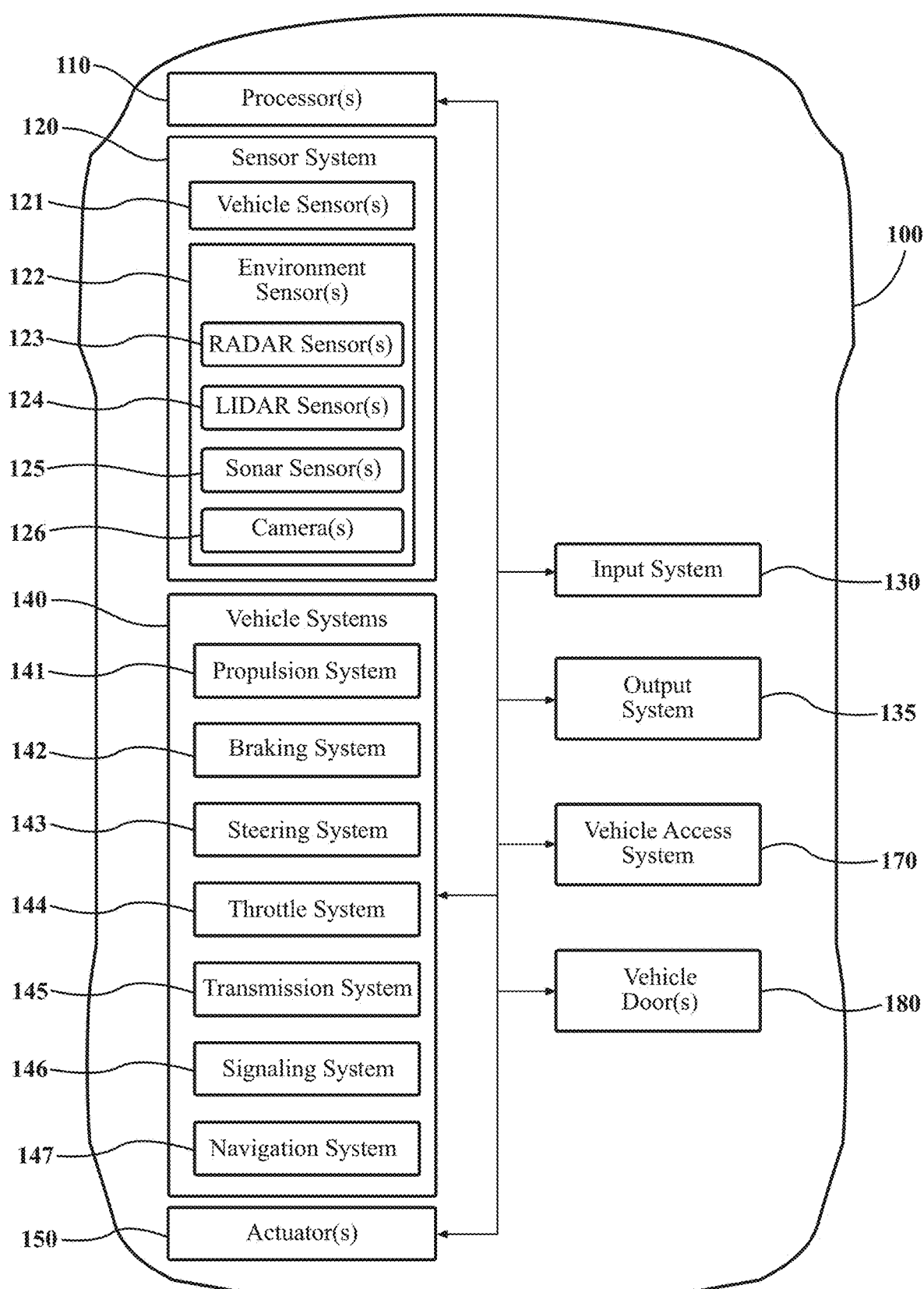
FIG. 1 illustrates one embodiment of a vehicle within which systems and methods disclosed herein may be implemented.

Systems, methods, and other embodiments associated with improving access to an interior of an object, such as a cabin of a vehicle, are disclosed herein. As noted above, conventional vehicle wireless access systems suffer from security vulnerabilities whereby a hacker may gain access to a vehicle through intervention into a radio channel. While keyless access systems that utilize fingerprint scans and/or facial scans may be used by a vehicle to improve security, such keyless access systems may be vulnerable if a hacker obtains access to the facial scans and/or the fingerprint scans.

To address these issues, a system for controlling access to an interior of an object based upon proprioception-related factors as a hand of a user applies force to a handle on an exterior of the object is described herein. In an example, the object is a vehicle, the interior is a cabin of the vehicle, and the handle is comprised by a door of the vehicle. The handle may have sensors integrated therein, such as force sensors. In an example, the sensors are tensiometric sensors or piezoelectric sensors. During a first time period, a hand of the user grips the handle a plurality of times while opening the door. As the hand of the user applies first force to the handle while opening the door during the first time period, the sensors generate electrical signals which are converted into first measurements. The system obtains the first measurements from the sensors. The first measurements include static characteristics and/or dynamic characteristics of the hand. In general, the static characteristics do not change over time as the user applies the first force to the handle during the first time period. The static characteristics may include a shape of the hand, an orientation of the hand on the handle, a position of the hand on the handle, and/or a gripping load distributed across the handle. In general, the dynamic characteristics may change over time as the user applies force to the handle during the first time period. Dynamic characteristics of the hand may include angles at which the handle is pulled by the hand of the user over the first time period, gripping pressures applied to different regions of the handle by different parts of the hand (e.g., different fingers, palm, etc.) over the first time period, pulling forces (or pushing forces) applied to the different regions of the handle by the hand over the first time period, and/or overall pulling forces (or pushing forces) applied to the handle by the hand over the first time period. The dynamic characteristics may also include ratios of measurements, such as a ratio of a first force applied by a first digit of the hand at a timestep to a second force applied by a second digit of the hand at the timestep.

According to embodiments, the system generates a profile for the user and/or the handle based upon the first measurements. In an example, the profile includes average measurements generated by each sensor at each timestep as the user grips the handle the plurality of times while opening the door. The profile may also include acceptable deviations for each of the average measurements at each timestep. According to embodiments, the system trains a machine learning model (e.g., a neural network) based upon the first measurements, where the machine learning model includes learned parameters that are based upon the first measurements. The system stores the profile and/or the machine learning model in a data store within the vehicle and/or in a data store located in a cloud-computing environment.

During a second time period that occurs subsequent to the first time period, the hand of the user grips the handle of the vehicle while the user attempts to open the door of the vehicle. As the hand of the user applies second force to the handle during the second time period, the sensors generate electrical signals which are converted into second measurements. The second measurements include static characteristics and/or dynamic characteristics as described above. The system obtains the second measurements from the sensors. The system identifies the user as being authorized to access the cabin of the vehicle based upon the first measurements and the second measurements. According to embodiments, the system compares the average measurements in the profile to corresponding measurements in the second measurements and identifies the user as being authorized to access the cabin of the vehicle when one or more of the second measurements are within a threshold range of one or more corresponding average measurements in the profile. According to embodiments, the system provides the second measurements as input to the machine learning model described above. The machine learning model outputs a value based upon the learned parameters of the machine learning model and the second measurements, where the value is indicative of whether or not the user is authorized to access the cabin of the vehicle. The system identifies the user as being authorized to access the cabin based upon the value. The system grants the user access to the cabin of the vehicle upon identifying the user as being authorized. For instance, the system may unlock a door of the vehicle.

The above-described technologies present various advantages over conventional system that control access to interiors of objects, such as systems in vehicles that control entry to a cabin (or a trunk) of the vehicle. First, unlike systems that transmit keys wirelessly, the above-described technologies are not vulnerable to techniques employed by hackers which intercept keys through intervention into a radio channel. Second, even if a hacker had access to the static characteristics and/or dynamic characteristics of a user as described above, it would be difficult, if not impossible, for the hacker to precisely replicate such characteristics. Third, according to embodiments, the above-described technologies may be also implemented remotely from a vehicle in a cloud-computing environment. Then, according to the embodiments, the decision as to whether or not the user is authorized to access the vehicle is made in the cloud-computing environment based upon static and/or dynamic characteristics of the user stored at the cloud-computing environment. As such, security of the vehicle may be improved as the static characteristics and/or dynamic characteristics of the user are not stored on the vehicle and hence cannot be easily accessed by a hacker. Fourth, the above-described technologies may be useful in shared-vehicle scenarios, such as with a taxi or ride-sharing service. Fifth, the above-described technologies may be useful in preventing an impaired driver (e.g., an inebriated driver) from accessing a vehicle.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with granting access to the vehicle based upon static and/or dynamic characteristics of a hand of a user.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 100, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100. In an example, the vehicle access system 170 may be implemented within a cloud-computing environment or on a server.

Some of the possible elements of the vehicle 100 are shown in FIG. 1 and will be described along with subsequent figures. However, a description of many of the elements in FIG. 1 will be provided after the discussion of FIGS. 2-10 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a vehicle access system 170 as well as a vehicle door(s) 180 that are implemented to perform methods and other functions as disclosed herein relating to improving access to an interior of the vehicle by utilizing proprioception-related factors as a hand of a user grips a handle of a door of the vehicle 100. As will be discussed in greater detail subsequently, the vehicle access system 170, in various embodiments, is implemented partially within the vehicle 100, and as a cloud-based service. For example, in one approach, functionality associated with at least one module of the vehicle access system 170 is implemented within the vehicle 100 while further functionality is implemented within a cloud-based computing system.

Figure 2:
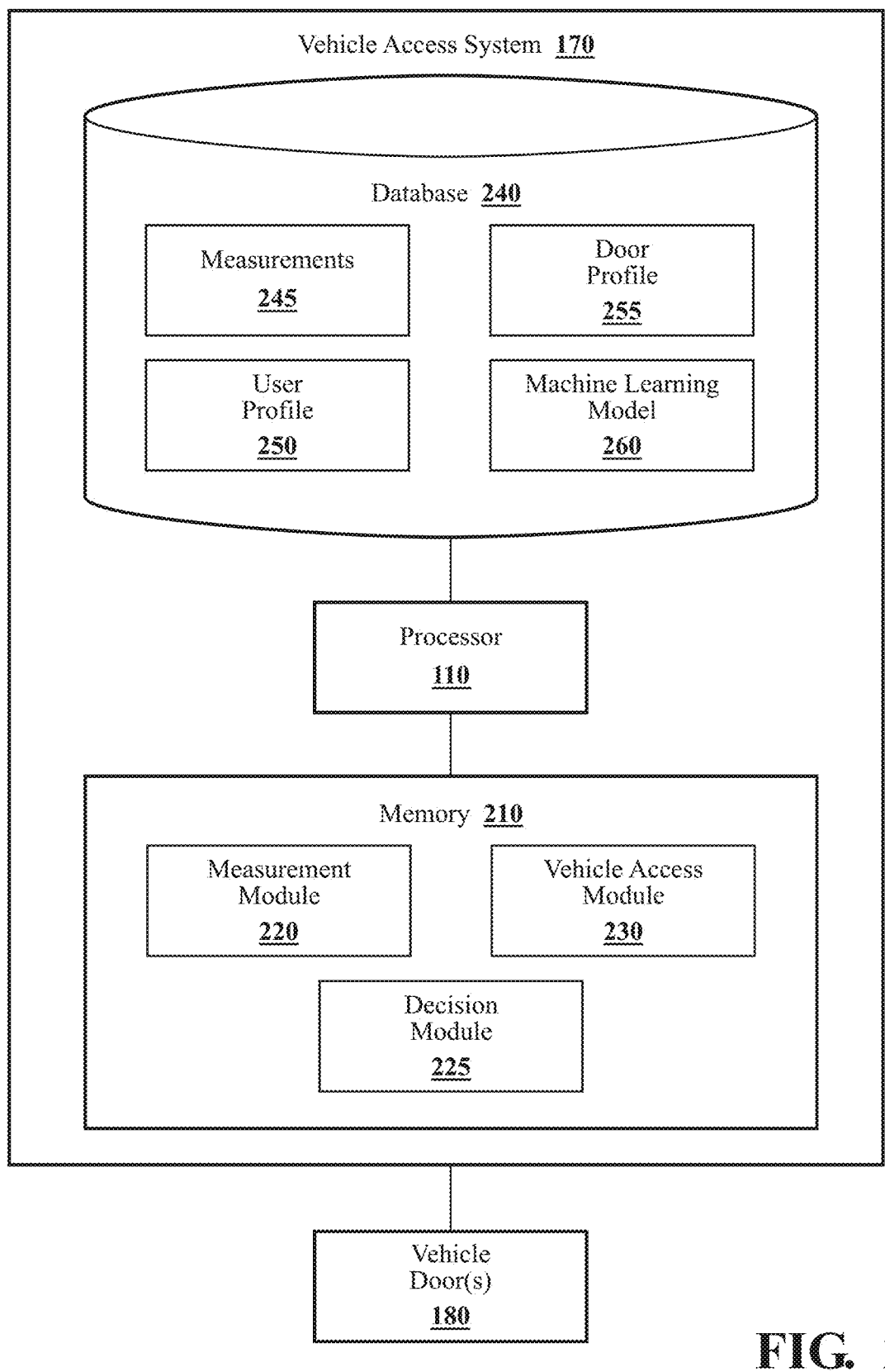
FIG. 2 illustrates one embodiment of a vehicle access system that is associated with the vehicle illustrated in FIG. 1.

With reference to FIG. 2, one embodiment of the vehicle access system 170 of FIG. 1 is further illustrated. The vehicle access system 170 is shown as including a processor 110 from the vehicle 100 of FIG. 1. Accordingly, the processor 110 may be a part of the vehicle access system 170, the vehicle access system 170 may include a separate processor from the processor 110 of the vehicle 100, or the vehicle access system 170 may access the processor 110 through a data bus or another communication path. In one embodiment, the vehicle access system 170 includes a memory 210 that stores a measurement module 220, a decision module 225, and a vehicle access module 230. The memory 210 is a random-access memory (RAM), read-only memory (ROM), a hard-disk drive, a flash memory, or other suitable memory for storing the measurement module 220, the decision module 225, and the vehicle access module 230. The measurement module 220, the decision module 225, and the vehicle access module 230 are, for example, computer-readable instructions that when executed by the processor 110 cause the processor 110 to perform the various functions disclosed herein.

The vehicle access system 170 as illustrated in FIG. 2 is generally an abstracted form of the vehicle access system 170 as may be implemented between the vehicle 100 and a cloud-computing environment.

With reference to FIG. 2, the measurement module 220 generally includes instructions that function to control the processor 110 to receive data inputs from one or more sensors of the vehicle 110. In general, during a first time period (e.g., during a calibration procedure), the measurement module 220 is configured to obtain first measurements of static characteristics and/or dynamic characteristics of a hand of a user as the hand applies first force to a handle on an exterior of the object that controls access to an interior of an object. During a second time period that occurs subsequent to the first time period, the measurement module 220 is configured to obtain second measurements of static characteristics and/or dynamic characteristics of the hand of the user as the hand applies second force to the handle. The measurement module 220 may store the first measurements and/or the second measurements in the database 240 (as part of the measurements 245) and/or the memory 210.

The decision module 225 generally includes instructions that function to control the processor 110 to receive data inputs from the measurement module 220. As will be explained in greater detail below, the decision module 225 determines whether or not a user is authorized to access an interior of an object based upon measurements and stored measurements. The decision module 225 also generates profiles for users and/or doors based upon measurements obtained during a calibration procedure. The decision module 225 may also generate and/or update machine learning models (described in greater detail below).

The vehicle access module 230 generally includes instructions that function to control the processor 110 to receive data inputs from the decision module 225. In general, upon receiving an indication from the decision module 225, the vehicle access module 230 is configured to grant a user access to an interior of an object, such as a cabin of the vehicle 100. In an example, the vehicle access module 230 transmits a signal a door that causes the door to unlock.

Moreover, in one embodiment, the vehicle access system 170 includes a database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the measurement module 220, the decision module 225, and/or the vehicle access module 230 in executing various functions.

In one embodiment, the database 240 includes measurements 245. The measurements 245 may include first measurements generated as part of a calibration procedure for the vehicle access system 170 as well as second measurements generated during use of the vehicle access system 170 (explained in greater detail below).

In one embodiment, the database 240 includes a user profile 250 for a user. The user profile 250 for the user includes measurements of static characteristics and/or dynamic characteristics of a hand of the user (obtained during a calibration procedure) as the hand applies force to a handle that controls access to an interior of an object. In an example, the measurements are average measurements (described in greater detail below). The vehicle access system 170 may utilize the user profile 250 to determine whether or not to unlock the vehicle door 180 of the vehicle 100.

In one embodiment, the database 240 includes a door profile 255. The door profile 255 for the user includes measurements of static characteristics and/or dynamic characteristics of hands of users that are authorized to open the vehicle door 180. In an example, the door profile 255 includes the user profile 250.

In one embodiment, the database 240 includes a machine learning model 260. In an example, the machine learning model 260 includes learned parameters that are based upon measurements of static characteristics and/or dynamic characteristics of a hand of a user as the user applies force to the handle during a calibration procedure. The learned parameters may also be adjusted subsequent to the calibration procedure in order to improve performance of the machine learning model 260. In general, the machine learning model 260 is configured to take current measurements of static characteristics and/or dynamic characteristics of the hand of the user as the user applies force to the handle. Based upon the learned parameters and the current measurements, the machine learning model 260 is configured to output a value (or values) that is/are indicative of whether or not the user is an authorized user of the vehicle. According to embodiments, the decision module 225 comprises the machine learning module 260.

According to embodiments, the machine learning model 260 is a classifier model that is configured to classify static characteristics and/or dynamic characteristics of a hand as belonging or not belonging to an authorized user of the vehicle 100.

According to embodiments, the machine learning model 260 is a neural network comprising nodes and edges connecting the nodes, where the edges are assigned learned weights that are based upon measurements of the static and/or dynamic characteristics of the hand of the user. For instance, the machine learning model 260 may be a neural network comprising an input layer comprising first node(s), at least one hidden layer comprising second node(s), and an output layer comprising third node(s), where the first node(s) are connected to the second node(s) via first edges and the second node(s) are connected to the third node(s) via second edges, and where the first edges and second edges have learned weights assigned thereto. The learned weights are based upon the measurements of static and/or dynamic characteristics of the hand of the user as the user applies force to the handle during the calibration procedure (or subsequent to the calibration procedure). According to embodiments, the machine learning model 260 comprises a plurality of neural networks, where each neural network is assigned to a particular sensor. For instance, the plurality of neural networks may include a first neural network that is assigned to a first pressure sensor that makes contact with a first finger (e.g., index) of a hand of the user when the hand grips the handle and a second neural network that is assigned to a second pressure sensor that makes contact with a second finger (e.g., middle) of the hand of the user when the hand grips the handle.

Although the database 240 is illustrated in FIG. 2 as being part of the vehicle access system 170 and the measurements 245, the user profile 250, the door profile 255, and the machine learning model 260 are illustrated in FIG. 2 as being stored in the database 240, other possibilities are contemplated. According to embodiments, the measurements 245, the user profile 250, the door profile 255, and the machine learning model 260 are stored in the memory 210. According to embodiments, the database 240 is separate from the vehicle access system 170. For instance, according to embodiments, the database 240 may be part of a cloud computing environment or a remote server, where the cloud computing environment/remote server is in network communication with the vehicle access system 170, where the vehicle access system 170 is located within the vehicle 100.

Figure 3:
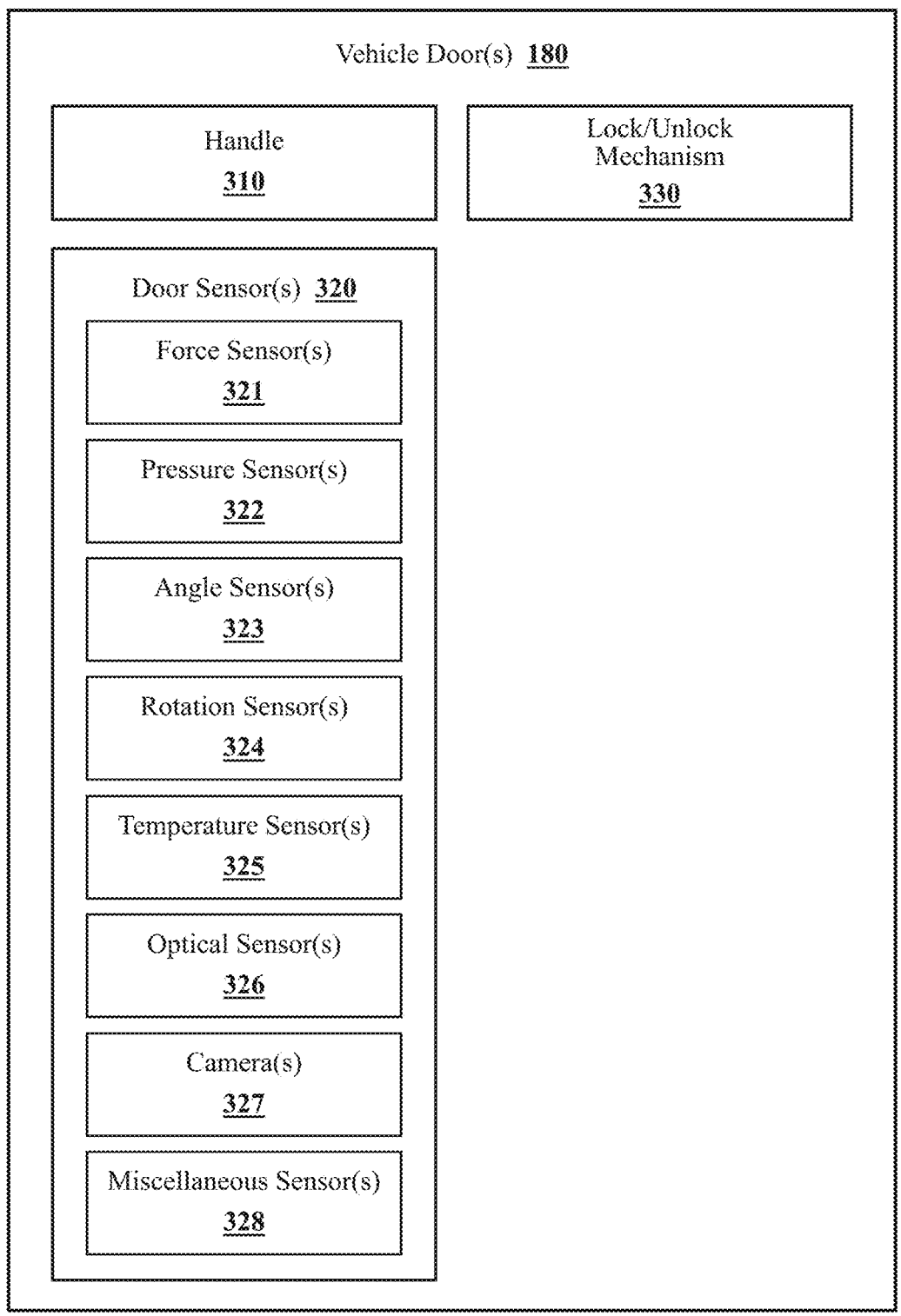
FIG. 3 illustrates one embodiment of a vehicle door that is associated with the vehicle illustrated in FIG. 1.

With reference now to FIG. 3, an example of the vehicle door 180 is depicted. In general, the vehicle door 180 is a physical barrier of the vehicle 100 that, when opened, provides access to a cabin of the vehicle 100 and that, when closed, prevents access to the cabin of the vehicle 100.

The vehicle door 180 includes a handle 310. In general, the handle 310 is located on an exterior of the vehicle door 180 and is configured to be gripped by a hand of a user as part of opening the vehicle door 180. The user applies force (e.g., pulling force, pushing force, rotational force, etc.) to the handle 310 in order to open the vehicle door 180. In an example, as the force is applied to the handle 310, the handle 310 moves from a rest position to one or more positions located in a direction from the handle 310 that extends in a direction in which the force is being applied.

The vehicle door 180 includes one or more door sensors 320 (referred to now herein as "the door sensors 320") that are configured to generate measurements of static characteristics and/or dynamic characteristics of the hand of the user as the user applies force to the handle 310 as part of a door opening operation of the vehicle door 180. At least some of the door sensors 320 are integrated into the handle 310. According to embodiments, some or all of the door sensors 320 may be covered with an elastic material to hide such sensors from view.

The door sensors 320 may include one or more force sensors 321 (referred to now herein as "the force sensors 321") that are configured to generate measurements of force applied to one or more regions of the handle 310 by the hand of the user over a time period. In an example, the time period begins when the user begins to apply force to the handle 310 and ends when the handle 310 is extended to a predetermined position. According to embodiments, the force sensors 321 comprise five force sensors, where each of the five force sensors are configured to make contact with a different digit (e.g., thumb, index finger, middle finger, ring finger, pinky finger) of a hand of the user as the user grips the handle 310. At each timestep in a time period, the five force sensors generate five force measurements as digits of the user apply force to the five force sensors. In an example involving two timesteps, the five force sensors generate five force measurements at a first timestep and an additional five force measurements at a second timestep. According to embodiments, the force sensors 321 are piezoelectric or tensiometric force sensors.

The door sensors 320 may include one or more pressure sensors 322 (referred to now as "the pressure sensors 322") that are configured to generate measurements of pressure applied to one or more regions of the handle 310 by the hand of the user over the time period. According to embodiments, the pressure sensors 321 comprise five pressure sensors, where each of the five pressure sensors are configured to make contact with a different digit (e.g., thumb, index finger, middle finger, ring finger, pinky finger) of the hand of the user as the user grips the handle 310. The five pressure sensors generate five pressure measurements as digits of the user apply pressure to one of the five pressure sensors. According to embodiments, the pressure sensors 322 are piezoelectric or tensiometric force sensors.

The door sensors 320 may include one or more angle sensors 323 (referred to now as "the angle sensors 323") that are configured to generate measurements of angles at which one or more regions of the handle 310 are pulled (or pushed) by the hand of the user over the time period. The measurements of the angles may be made with respect to a reference angle. According to embodiments, the pressure sensors 321 comprise five angle sensors, where each of the five angle sensors are configured to make contact with a different digit (e.g., thumb, index finger, middle finger, ring finger, pink finger) of a hand of the user as the user grips the handle 310. The five angle sensors generate five angle measurements as digits of the user apply force to one of the five angle sensors. Alternatively, pulling force vectors can be obtained by analyzing pressure measurements from high-precision pressure sensors.

The door sensors 320 may include one or more rotation sensors 324 that are configured to measure angular rotations of the handle 310 during the time period as the hand of the user rotates the handle 310. The one or more rotation sensors 324 may alternatively be referred to as one or more angular encoders or one or more angular sensors. The one or more rotation sensors 324 may be torque based or position based.

The door sensors 320 may include one or more temperature sensors 325 (referred to now as "the temperature sensors 325") that are configured to measure a temperature of one or more regions of the hand of the user as the hand of the user applies force to the handle 310 while gripping the handle 310 over the time period.

The door sensors 320 may include one or more optical sensors 326 that are configured to determine a position, orientation, and/or shape of a hand of the user on the handle 310 as the user applies force to the handle 310 over the time period.

The door sensors 320 may include one or more cameras 327 that are configured to capture images of the hand of the user as the user applies force to the handle 310 over the time period.

The vehicle door 180 may include one or more miscellaneous sensors 328 (referred to herein now as "the miscellaneous sensors 328") that are configured to generate measurements in addition to the measurements captured by the sensors 321-327 described above. For instance, the miscellaneous sensors 328 may include a fingerprint scanner that is configured to capture one or more fingerprints of the user as the user grips the handle 310 while applying force to the handle 310. The miscellaneous sensors 328 may include a handprint scanner that is configured to capture a handprint of the user as the user grips the handle 310 while applying force to the handle 310.

The vehicle door 180 includes a lock/unlock mechanism 330 that is configured to lock/unlock the vehicle door 180. In an example, the vehicle access system 170 communicates with the lock/unlock mechanism 330 in order to unlock the vehicle door 180 based upon identifying a user as an authorized user of the vehicle using proprioception-related factors.

Although the handle 310, the door sensors 320, and the lock/unlock mechanism 330 are described above as being part of the vehicle door 180, other possibilities are contemplated. For instance, the handle 310, the door sensors 320, and the lock/unlock mechanism 330 may be part of a trunk of the vehicle 100 and as such, the handle 310, the door sensors 320, and the lock/unlock mechanism 330 may provide access to a trunk of the vehicle 100.

Figure 4A:
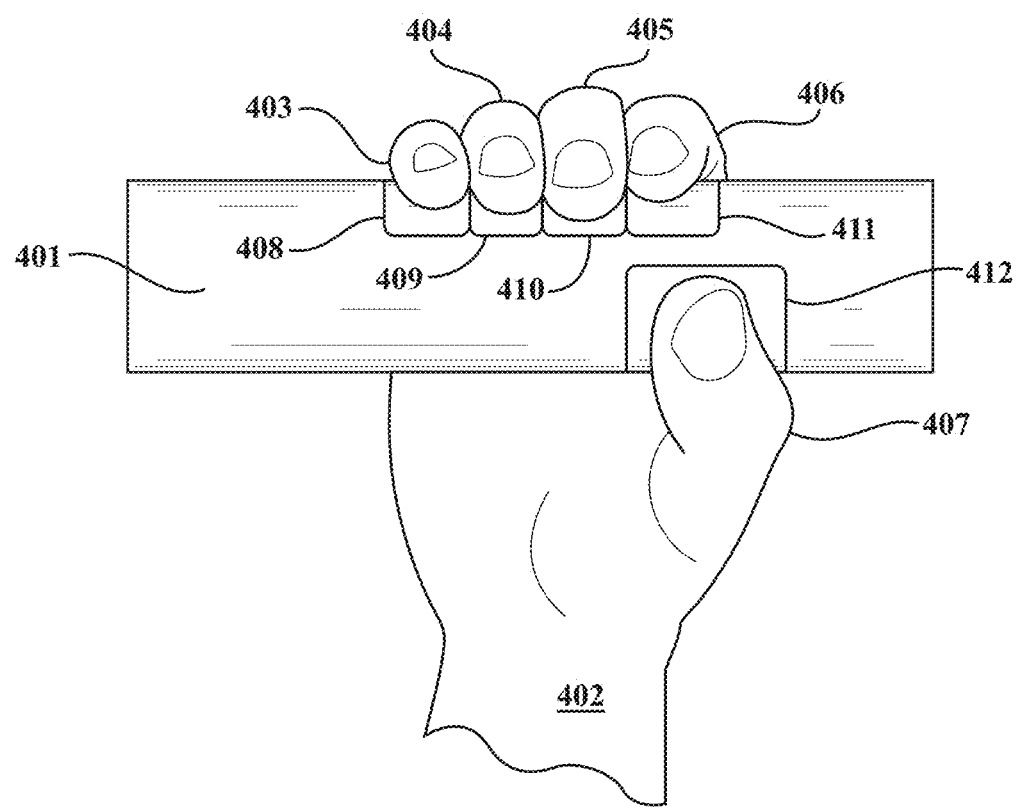
FIGS. 4A-B illustrate differing views of one embodiment of a handle of a vehicle.
Figure 4B:
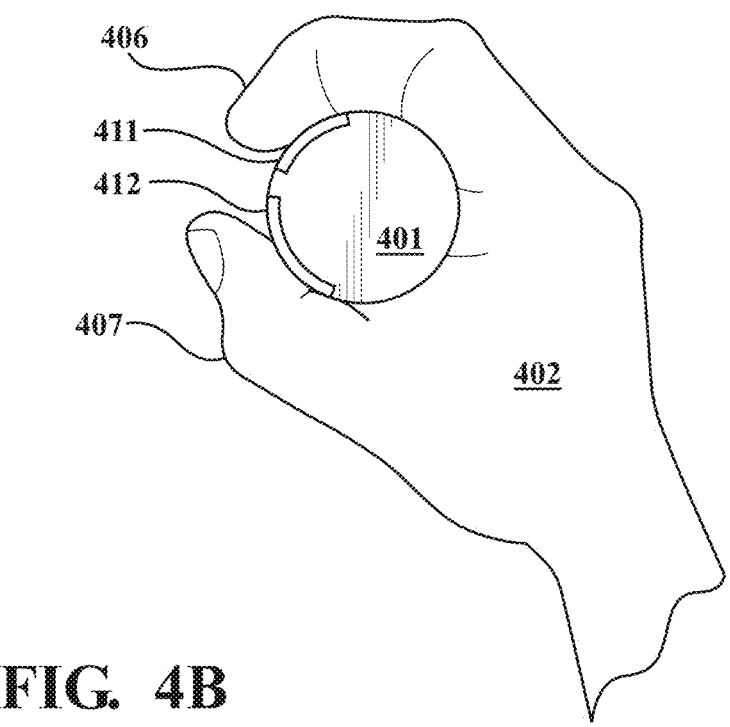

Referring now to FIG. 4A, an example handle 401 that is gripped by a hand 402 of a user is illustrated. The handle 401 may be the handle 310. As depicted in FIG. 4A, a pinky finger 403, a ring finger 404, a middle finger 405, an index finger 406, and a thumb 407 of the hand 402 grip a first sensor 408, a second sensor 409, a third sensor 410, a fourth sensor 411, and a fifth sensor 412, respectively, of the handle 401. In an example, the sensors 408-412 comprise the force sensors 321, the pressure sensors 322, the angle sensors 323, the temperature sensors 325, the optical sensor 326, and/or the miscellaneous sensors 328. The rotation sensors 324 may be integrated into the handle 401. A lens of the camera 327 may be oriented towards the hand 402 of the user. In an example, the first sensor 408 comprises one or more of a force sensor, a pressure sensor, a fingerprint sensor, an optical sensor, and/or a thermal sensor. Thus, it is to be understood that each sensor in the sensors 408-412 may include multiple sensors of different types. FIG. 4B illustrates a side view of the handle 401 depicted in FIG. 4A.

Figure 5:
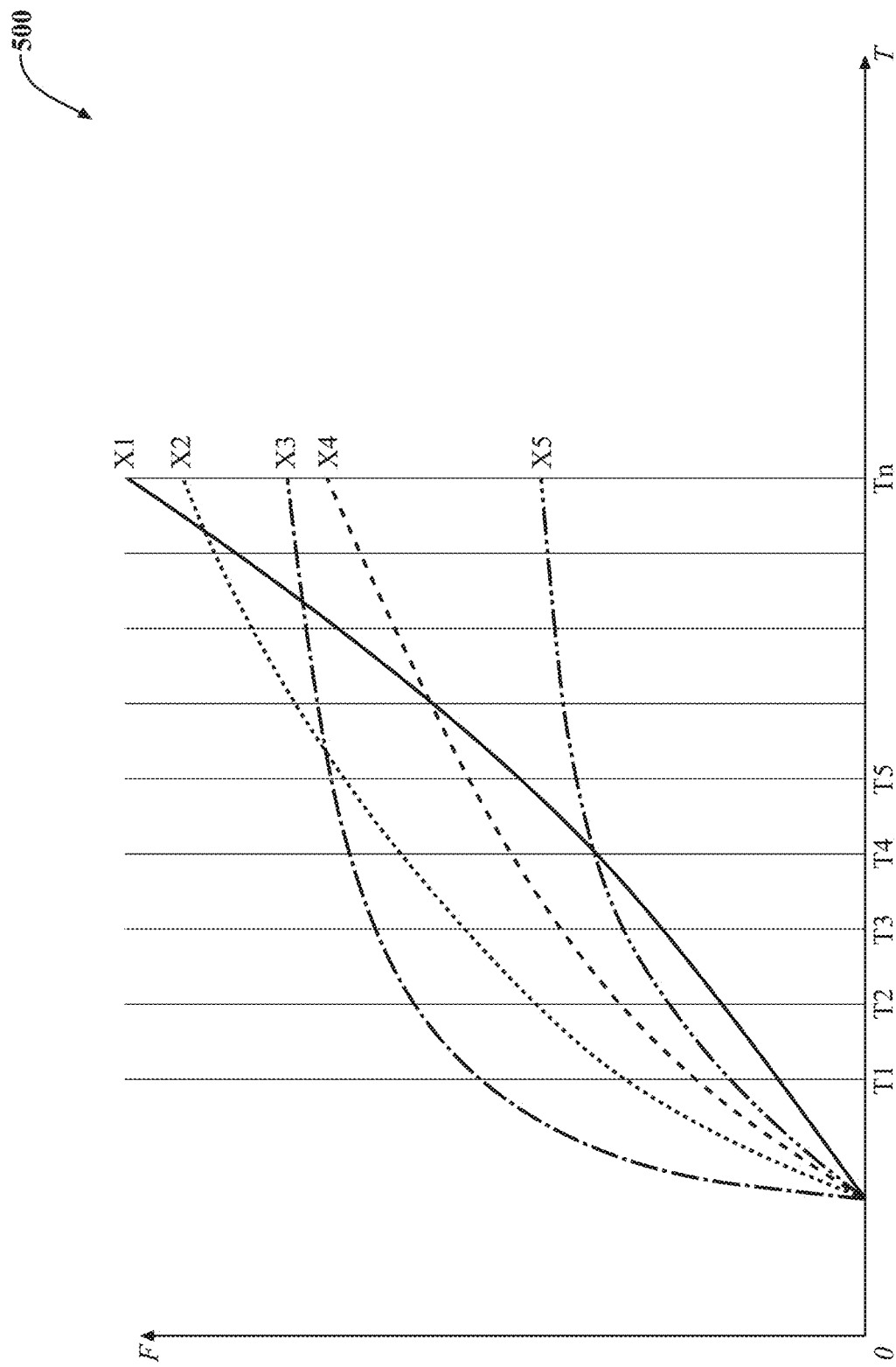
FIG. 5 depicts an example graph of force applied over a time period to different sensors of the handle illustrated in FIGS. 4A-B.

Referring now to FIG. 5, an example graph of force applied by the hand 402 of a user to the handle 401 over time is illustrated. In the example shown in FIG. 5, the y-axis represents force (e.g., measured in Newtons) and the x-axis represents time (e.g., measured in milliseconds). Alternatively, the y-axis may represent pressure (Pi), relative force (Fi/sum(Fi), relative pressure (Pi/sum(Pi)), a derived pressure, or a derived force. The x-axis includes a plurality of timesteps (T1 . . . $T_N$). Each line in the graph is indicative of a force applied to one of the sensors 408-412 over time. As will be discussed in greater detail below, the vehicle access system 170 may utilize data in the graph in order to generate a profile for the vehicle door 180 and/or the user and/or to train the machine learning model 260.

Figure 6A:
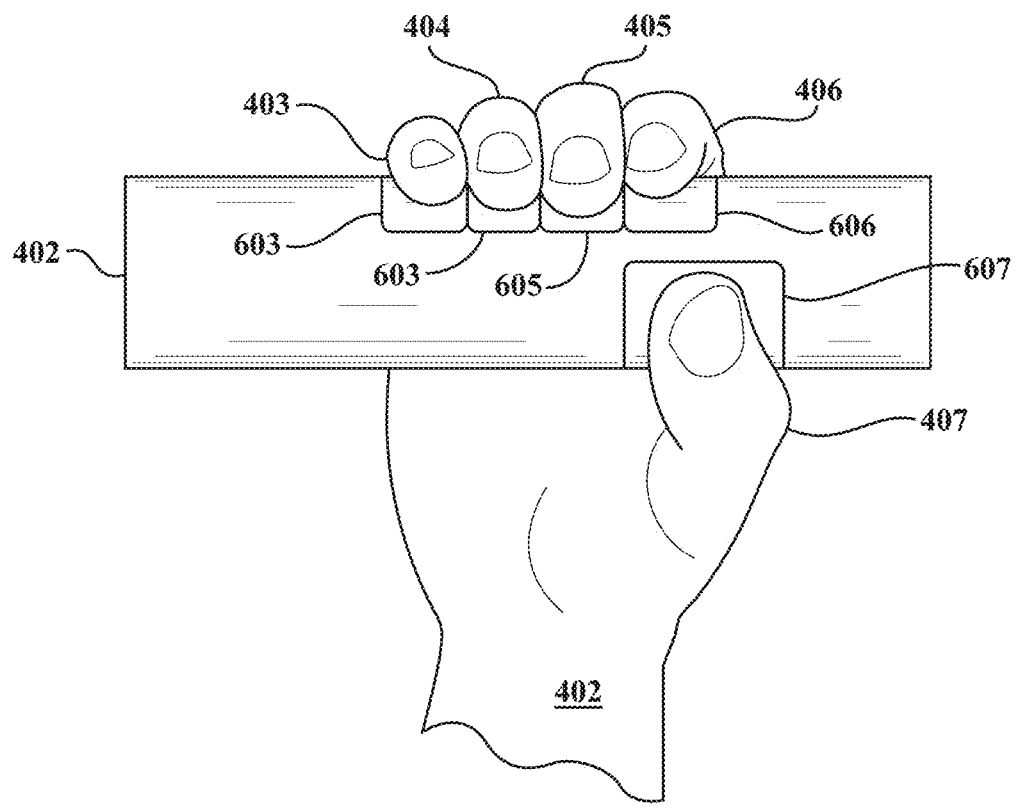
FIGS. 6A-B illustrate different views of one embodiment of a handle.
Figure 6B:
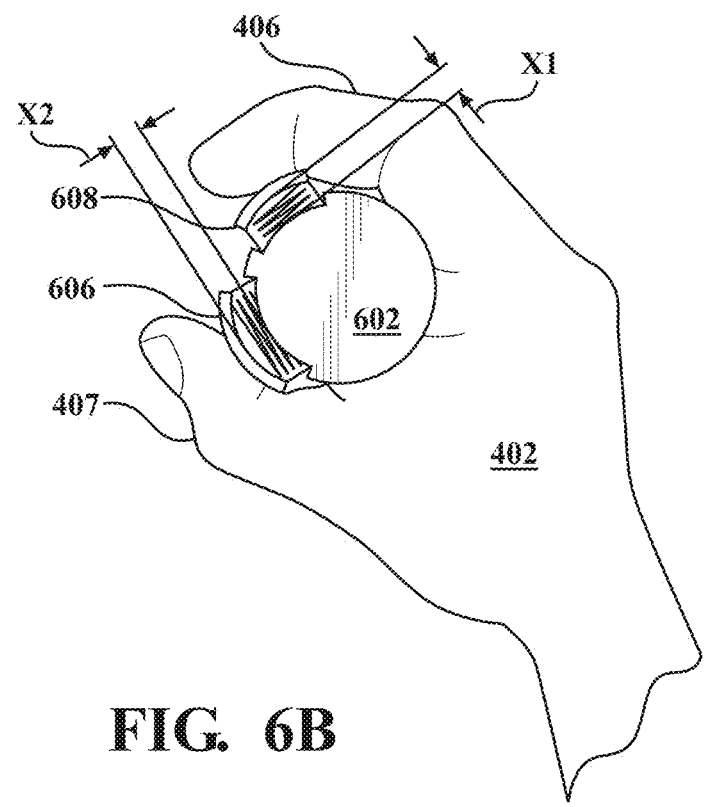

Referring now to FIG. 6A, an example handle 602 that is gripped by the hand 402 of a user is illustrated. The handle 602 may be the handle 310. As depicted in FIG. 6A, the pinky finger 403, the ring finger 404, the middle finger 405, the index finger 406, and the thumb 407 of the hand 402 grip a first sensor 603, a second sensor 604, a third sensor 605, a fourth sensor 606, and a fifth sensor 607, respectively, of the handle 401. Each of the sensors 603-607 are depressible by the user. A degree to which a sensor in the sensors 603-607 is depressed is indicative of a force applied to the sensor. FIG. 6B illustrates a side view of the handle 602 depicted in FIG. 6A.

Figure 7A:
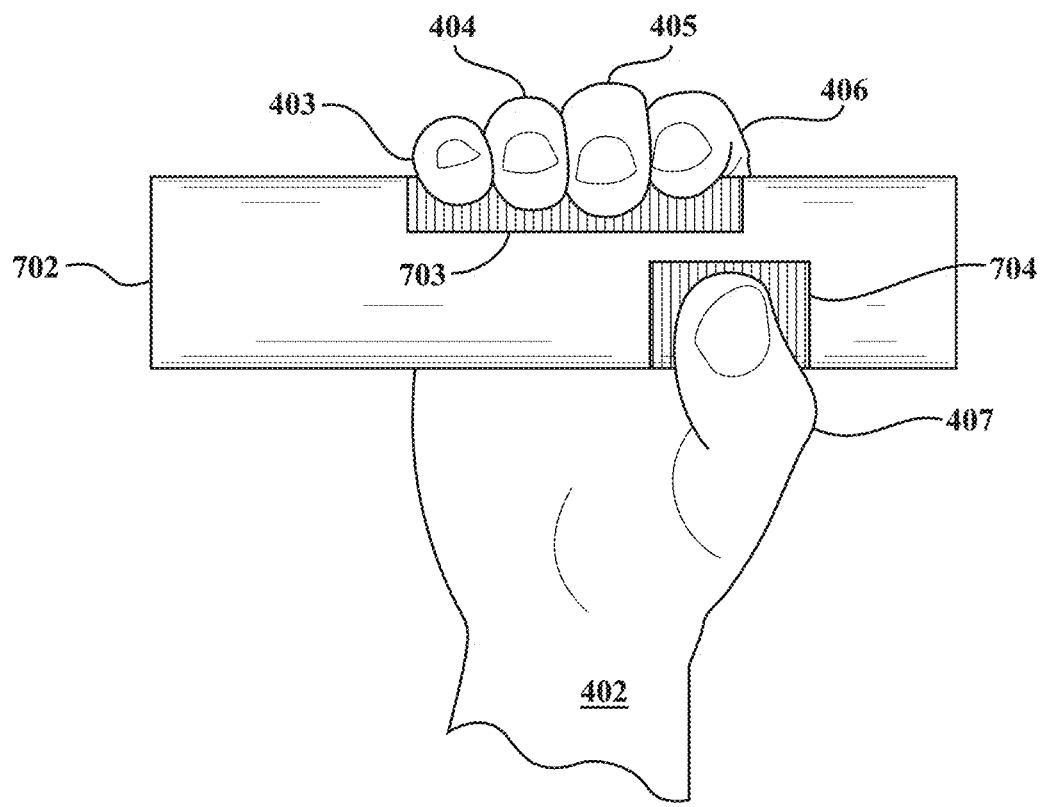
FIGS. 7A-B illustrate different views of one embodiment of a handle.
Figure 7B:
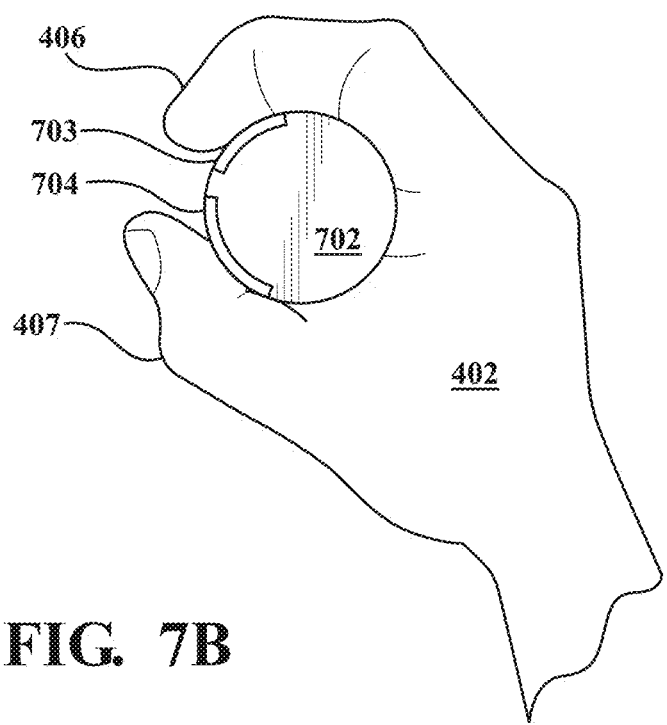

Referring now to FIG. 7A, an example handle 702 that is gripped by the hand 402 of a user is illustrated. The handle 702 may be the handle 310. As depicted in FIG. 7A, the pinky finger 403, the ring finger 404, the middle finger 405, and the index finger 406 grip a first sensor 703 and the thumb 407 grips a second sensor 704. The first sensor 703 and the second sensor 704 may be included in the door sensors 320. FIG. 7B illustrates a side view of the handle 702 depicted in FIG. 7A.

Figure 8A:
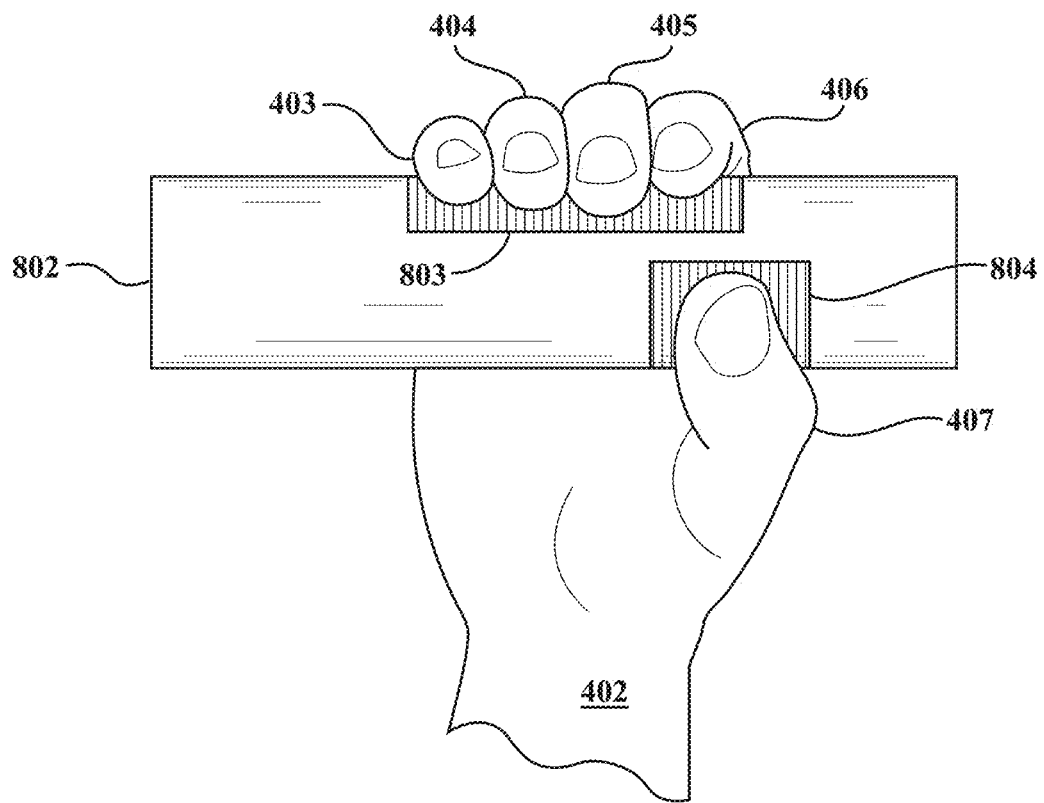
FIGS. 8A-B illustrate different views of one embodiment of a handle.
Figure 8B:
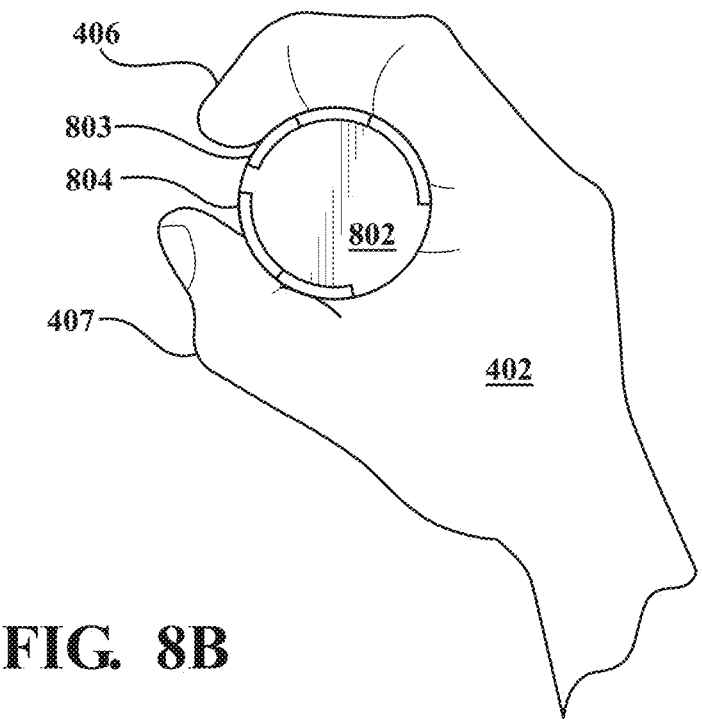

Referring now to FIG. 8A, an example handle 802 that is gripped by the hand 402 of a user is illustrated. The handle 802 may be the handle 310. As depicted in FIG. 8A, the pinky finger 403, the ring finger 404, the middle finger 405, and the index finger 406 grip a first sensor 803 and the thumb 407 grips a second sensor 804. In contrast to the handle 702 depicted in FIGS. 7A-B, the first sensor 803 and the second sensor 804 are configured to make contact with an entirety of the fingers 403-406 and the thumb 407, respectively. The first sensor 803 and the second sensor 804 may be included in the door sensors 320. FIG. 8B illustrates a side view of the handle 802 depicted in FIG. 8A.

Figure 9A:
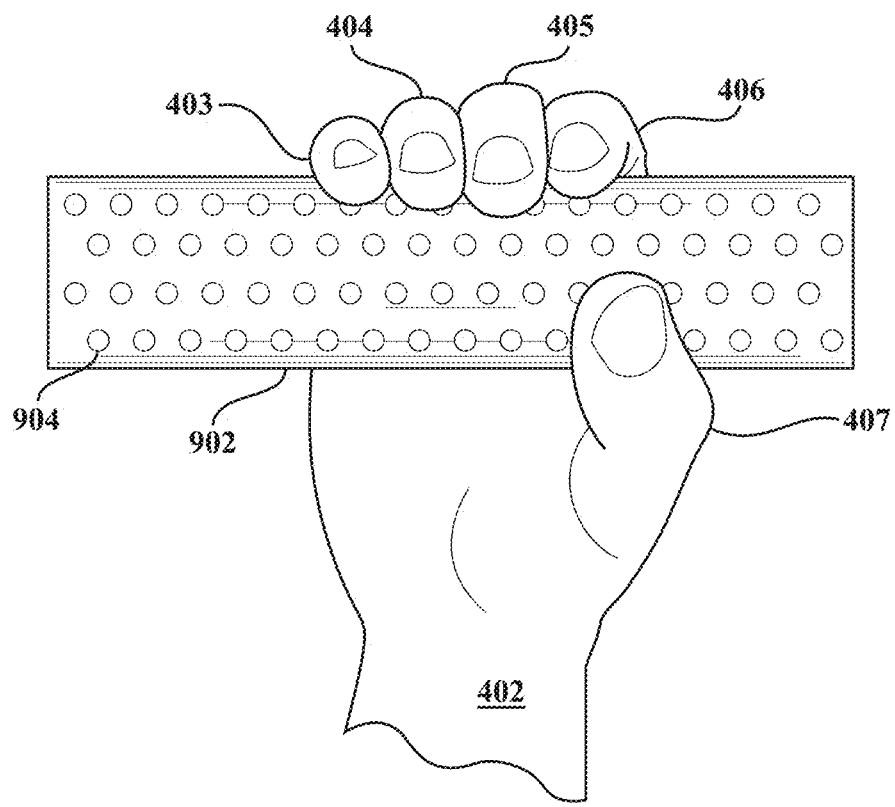
FIGS. 9A-B illustrate differing views of one embodiment of a handle.
Figure 9B:
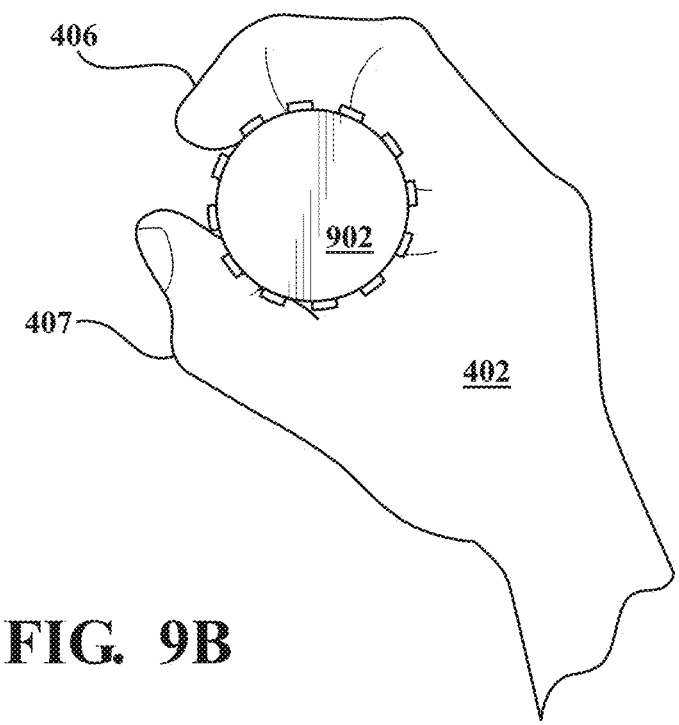

Referring now to FIG. 9A, an example handle 902 that is gripped by the hand 402 of the user is illustrated. The handle 902 may be the handle 310. As depicted in FIG. 9A, the pinky finger 403, the ring finger 404, the middle finger 405, the index finger 406, and the thumb 407 of the hand 402 grip the handle 902, where a plurality of sensors 904 (indicated by circles in FIG. 9A) are distributed throughout the handle 902. The plurality of sensors 904 may be included in the door sensors 320. FIG. 9A illustrates a side view of the handle 902 depicted in FIG. 9A.

Operation of the vehicle access system 170 is now set forth. Although the vehicle access system 170 is described below in the context of the vehicle 100, it is to be understood that the vehicle access system 170 is operable in other contexts. For instance, the vehicle access system 170 may be utilized in the context of a door on an outside of a building (i.e., an object) or a door to a room (i.e., an object) within the building. Additionally, the vehicle access system 170 may be utilized to control access to a relatively small area, such as a drawer, a cabinet, or a safe. Furthermore, although the vehicle access system 170 is described below as controlling access to an interior of an object, the vehicle access system 170 may control access to areas which are not enclosed overhead. For instance, the vehicle access system 170 may control access to a fenced-in area having a door that has a handle mounted thereon.

During a first time period, a calibration procedure for the handle 310 is performed. In an example, the calibration procedure occurs at a time at which a user becomes authorized to access a vehicle, such as when the user purchases the vehicle 100. During the calibration procedure, the user grips the handle 310 at least one time and applies first force to the handle 310 in order to open the vehicle door 180 at least one time. As the user applies the first force to the handle 310 during the first time period, the door sensors 320 generate first measurements of static characteristics and/or dynamic characteristics of the hand of the user.

In general, the static characteristics of the hand of the user do not change while the user applies the first force to the vehicle door 180 as part of opening the vehicle door 180. For instance, the static characteristics may include a shape of the hand, a position of the hand on the handle 310, an orientation of the hand on the handle 310, or a gripping load distributed across digits and a palm of the hand.

In general, the dynamic characteristics of the hand of the user may change over time while the user applies the first force to the vehicle door 180 as part of opening the vehicle door 180. The dynamic characteristics may include angles at which the handle 310 is pulled by the hand of the user over the first time period, gripping pressures applied to different regions of the handle 310 by different parts of the hand (e.g., different digits of the hand, palm, etc.) over the first time period, pulling forces applied to different regions of the handle 310 by the hand over the first time period, pushing forces applied to different regions of the handle 310 by the hand over the first time period, overall gripping pressures applied to the handle 310 over the first time period, and/or overall pulling forces applied to the handle 310 by the hand over the first time period. The dynamic characteristics may also include rotational measurements of the handle 310 over time when the handle 310 is able to be rotated (e.g., a knob).

The first measurements of the static and/or dynamic characteristics may include direct measurements and derived measurements. Direct measurements are measurements that are generated directly by the door sensors 320. In an example, direct measurements include a first measurement of force applied to a first region of the handle 310 by a first digit of a hand of the user and a second measurement of force applied to a second region of the handle 310 by a second digit of the hand of the user. Derived measurements are measurements that are generated from the direct measurements. In an example, derived measurements include a ratio of the first measurement to the second measurement. In another example, derived measurements include a sum of the first measurement and the second measurements.

The first measurements may be homogenous or heterogenous. In one example, the first measurements include pressure measurements. In another example, the first measurements include a combination of force measurements and pressure measurements. In a further example, the first measurements include force measurements and measurements derived from the force measurements, such as ratios of the force measurements to one another.

As noted above, the door sensors 320 generate the first measurements over the first time period. As such, the first measurements are generated at a plurality of timesteps. In an example, the plurality of timesteps are 5-200 ms apart, such as 50 ms apart. In an example, the first measurements include a first measurement taken at a first timestep, a second measurement taken at a second timestep, and a third measurement taken at a third timestep, where the first timestep, the second timestep, and the third timestep occur chronologically. In an example, the door sensors 320 begin to generate the first measurements when the hand of the user makes contact with the handle 310. In the example, the door sensors 320 finish generating the first measurements when the handle 310 reaches a position that would open the vehicle door 180 if the vehicle door 180 were unlocked. Following the example above, the door sensors 320 generate the first measurement when the hand makes contact with the handle 310, the second measurement when the user is pulling the handle 310, and the third measurement when the handle 310 reaches the position that would open the vehicle door 180 if the vehicle door 180 were unlocked. It is to be understood that a number of timesteps may be dynamic and based upon how long the user takes to open the vehicle door 180. Alternatively, the number of timesteps may be predetermined. When the number of timesteps is predetermined and the user exceeds the predetermined number of timesteps while opening the vehicle door 180, the measurement module 220 may truncate measurements occurring at timesteps that go beyond the predetermined number of timesteps.

It is contemplated that the user may open the vehicle door 180 several times during the calibration procedure. As such, the first measurements may include a plurality of measurement sets, where each set includes measurements from a different instance of the user opening the vehicle door 180 as part of the calibration procedure. For instance, the first measurements may include a first measurement set that includes measurements generated when the vehicle door 180 is opened a first time and a second measurement set that includes measurements generated when the vehicle door 180 is opened a second time.

In general, a measurement set comprises a plurality of measurement subsets, where each of the subsets corresponds to a different timestep while the vehicle door 180 is being opened, and where each measurement in a measurement subset is generated at the same timestep. For instance, in an example involving a first sensor and a second sensor and a first timestep and a second timestep, a first measurement set comprises a first measurement subset for the first timestep and a second measurement subset for the second timestep. The first measurement subset comprises a first measurement generated by the first sensor at the first timestep and a second measurement generated by the second sensor at the first timestep. The second measurement subset comprises a third measurement generated by the first sensor at the second timestep and a fourth measurement generated by the second sensor at the second timestep.

The measurement module 220 of the vehicle access system 170 obtains the first measurements from the door sensors 320. The decision module 225 may obtain the first measurements from the measurement module 220 and may generate the user profile 250 for the user based upon the first measurements. In an example, the decision module 225 determines average measurements for each sensor at each timestep based upon the first measurements (more specifically, measurement sets comprised by the first measurements) and determines acceptable deviations from the average measurements based upon the first measurements. In an example involving a first sensor and a second sensor (such as force sensors), for each timestep, the decision module 225 computes a first average measurement and a second average measurement for the first sensor and the second sensor, respectively, where the first average measurement is an average of measurements generated by the first sensor and the second average measurement is an average of measurements generated by the second sensor. The acceptable deviations may be standard deviations or a manually defined deviations.

Additionally or alternatively, the decision module 225 may generate the door profile 255 based upon the first measurements. The door profile 255 may include the user profile 250, as well as profiles for other users that are authorized to access the vehicle 100.

According to embodiments, the decision module 225 of the vehicle access system 170 trains the machine learning model 260 based upon the first measurements. For instance, as noted above, the first measurements may include a plurality of measurement sets, where each of the sets corresponds to a different instance of the user opening the vehicle door 180 as part of the calibration procedure. As such, the plurality of measurement sets may serve as training data for the machine learning model 260 (e.g., as part of a supervised learning procedure). The decision module 225 may also utilize other data as training data (e.g., measurements of other users applying force to handles).

According to a first embodiment, the door sensors 320 of the handle 310 include a first pressure sensor, a second pressure sensor, a third pressure sensor, a fourth pressure sensor, and a fifth pressure sensor. When the handle 310 is grabbed by the user, the first pressure sensor, the second pressure sensor, the third pressure sensor, the fourth pressure sensor, and the fifth pressure sensor are depressed by respective digits of the hand of the user. The depressions of the first through fifth sensors cause electrical signals to be generated which are indicative of a first pressure ($P_1$), a second pressure ($P_2$), a third pressure ($P_3$), a fourth pressure ($P_4$), and a fifth pressure ($P_5$), where each of the pressures is generated based upon a depression from one of the digits. In the example, $P_1$ through $P_5$ represent maximum pressures obtained during the first time period. The decision module 225 generates an array that stores $P_1$ through $P_5$ and stores the array as part of user profile 250 and/or the door profile 255 in the database 240. The decision module 225 may sum $P_1$ through $P_5$ to obtain an overall pressure and store the overall pressure as part of the array. The decision module 225 may also compute relative pressures between the pressures $P_1$ through $P_5$ and store the relative pressures as part of the array. In an example, the array may include entries such as $K_1=P_1/P_2$, $K_2=P_2/P_3$, $K_3=P_3/P_4$, and so forth.

According to a second embodiment, the door sensors 320 of the handle 310 include a first pressure sensor, a second pressure sensor, a third pressure sensor, a fourth pressure sensor, and a fifth pressure sensor. When the handle 310 is grabbed by the user, the first pressure sensor, the second pressure sensor, the third pressure sensor, the fourth pressure sensor, and the fifth pressure sensor are depressed by respective digits of the hand of the user. The depressions of the first through fifth sensors cause electrical signals to be generated which are indicative of a first pressure ($P_1$), a second pressure ($P_2$), a third pressure ($P_3$), a fourth pressure ($P_4$) and a fifth pressure ($P_5$), where each of the pressures is generated based upon a depression from one of the digits. The decision module 225 generates an N by M array, where N is a number of sensors and M is a number of timesteps at which measurements are generated by the sensors.

Subsequent to completion of the calibration procedure, it is contemplated that the user wishes to open the vehicle door 180. During a second time period that occurs subsequent to the first time period, the hand of the user applies second force to the handle 310 as the user attempts to open the vehicle door 180. The sensor systems 320 generate second measurements based upon contact of the hand with the handle 310 as the hand applies the second force. Types of the second measurements generally corresponds to types of the first measurements. In an example, the first measurements and the second measurements are pressure measurements. The measurement module 220 obtains the second measurements.

The decision module 225 obtains the second measurements from the measurement module 220 and identifies the user as being authorized (or unauthorized) to access the cabin of the vehicle 100 based upon the first measurements and the second measurements. According to one embodiment, the decision module 225 accesses the machine learning model 260. For instance, the decision module 225 may load the machine learning model 260 into the memory 210 from the database 240. The decision module 225 provides the second measurements as input to the machine learning model 260. The machine learning model 260 outputs at least one value based upon the learned parameters and the second measurements, where the at least one value is indicative of whether static characteristics and/or dynamic characteristics of the hand of the user measured during the second time period match (or are substantially similar to) static characteristics and/or dynamic characteristics of the hand as measured during the first time period as part of the calibration procedure. The decision module 225 identifies the user as being authorized to access the vehicle 100 based upon the at least one value.

According to another embodiment, the decision module 225 compares each of the second measurements to corresponding measurements within the user profile 250. For instance, the decision module 225 may compare a first measurement in the second measurements with a corresponding measurement in the user profile 250, where the first measurement and the corresponding measurement may be generated by the same sensor of the handle 310 at corresponding timesteps in the first time period and the second time period. When the first measurement is within a threshold range (specified in the user profile 250) of the corresponding measurement, the decision module 225 may identify the user as being authorized to access the vehicle 100. Similarly, the decision module 225 may compare each of the second measurements with corresponding measurements in the user profile 250 in order to identify the user as being authorized. In an example, the decision module 225 identifies the user as being authorized when a threshold number of measurements are within corresponding threshold ranges of measurements in the user profile 250.

Upon receiving an indication from the decision module 225, the vehicle access module 230 grants the user access to the cabin (or the trunk) of the vehicle based upon identifying the user as being authorized. In an example, the vehicle access module 230 transmits a signal to the lock/unlock mechanism 330 which causes the vehicle door 180 to be unlocked. As the vehicle door 180 is now unlocked, the user may apply further force to pull open the door. The user may then enter the cabin of the vehicle 100 and/or access the trunk. In another example, the vehicle access module 230 transmits a signal to a motor within the vehicle door 180 which causes the motor to generate force which opens the vehicle door 180 (without requiring the user to apply further force).

According to embodiments, the measurement module 220 stores the second measurements in the memory 210 and/or the database 240. The decision module 225 may update the machine learning model 260 using the second measurements. For instance, decision module 225 may retrain the machine learning model 260 based upon the second measurements.

Although the above-described technologies have been described as being performed by systems of the vehicle 100, other possibilities are contemplated. According to the embodiments, the first measurements are generated by the door sensors 320 of the vehicle as described above. However, according to the embodiments, the measurement module 220 transmits the first measurements over a network connection (e.g., a wireless connection) to a server computing device, such as a server in a cloud-computing environment. In the embodiments, the server computing device (which may comprise the decision module 225) generates the user profile 250, the door profile 255, and/or the machine learning model 260 as described above. According to the embodiments, the second measurements are generated by the door sensors 320 of the vehicle 100 as described above. However, according to the embodiments, the measurement module 220 transmits the second measurements over the network connection to the server computing device. The server computing device (which may comprise the decision module 225) identifies the user as being authorized (or unauthorized) to access the vehicle 100 using the above-described processes. Upon identifying the user as being authorized, the server computing device transmits a message over the network connection to the vehicle access module 230. Upon receiving the message, the vehicle access module 230 grants the user access to the cabin and/or trunk of the vehicle 100 (e.g., by unlocking the vehicle door 180).

Although the above-described technologies have been described above in the context of a single user, other possibilities are contemplated. According to embodiments, the vehicle decision module 225 of the vehicle access system 170 performs the above-described processes to generate a second user profile for a second user of the vehicle 100 (e.g., a family member of the user, an employee who works at the same organization of the user, etc.). The decision module 225 may store the second user profile as part of the door profile 255. Additionally or alternatively, the decision module 225 may generate a second machine learning model for the second user using the above-described processes. The decision module 225 may utilize the second user profile and/or the second machine learning model 260 to identify the second user as an authorized user of the vehicle 100. In this manner, multiple users may employ the above-described technologies in order to access the vehicle 100.

Although the above-described technologies have been described in a context of a single handle of a single vehicle, other possibilities are contemplated. According to embodiments, the vehicle 100 is part of a fleet of shared vehicles, such as a taxi service. According to embodiments, the decision module 225 generates the user profile 250 and/or the machine learning model 260 as described above and transmits the user profile 250 and/or the machine learning model 260 to a server computing device, such as a server in a cloud-computing environment. Alternatively, the server computing device generates the user profile 250 and/or the machine learning model 260 using the first measurements as described above. In either case, the user profile 250 and/or the machine learning model 260 are stored within a datastore of the server computing device. According to the embodiments, during the second time period, the hand of the user makes contact with a second handle of a second vehicle, where the user is authorized to enter the second vehicle. In an example, the second vehicle is part of the fleet of shared vehicles and is of a similar make as the first vehicle. Sensor systems of the second vehicle generate second measurements as described above. The second vehicle transmits the second measurements to the server computing device. The server computing device identifies the user as being authorized (or unauthorized) to access the second vehicle using the above-described processes. Upon identifying the user as being authorized, the server computing device transmits a message over the network connection to the second vehicle. Upon receiving the message, the vehicle 100 grants the user access to the cabin and/or trunk of the second vehicle (e.g., by unlocking a vehicle door of the second vehicle).

According to embodiments, the door sensors 320 begin to generate the second measurements when the handle 310 is moved from a rest position (i.e., a default position where the handle 310 rests when a hand of the user is not in contact with the handle 310) while being gripped by the hand of the user. When the handle 310 reaches a first position while being gripped by the hand of the user, the decision module 225 identifies the user as being authorized to access the vehicle 100 using the processes described above. In an example, the first position is located in a direction of a pulling force applied to the handle 310 by the user. When the handle 310 reaches a second position while being gripped by the hand of the user, the vehicle access module 230 transmits a signal to the lock/unlock mechanism 330 causing the vehicle door 180 to unlock. In an example, the second position is located in the direction of the pulling force applied by the user to the handle 310. In this manner, the vehicle access system 170 is able to provide seamless entry to the vehicle 100 from the user perspective.

According to embodiments, the handle 310 includes a fingerprint scanner. During the first time period, the fingerprint scanner generates a first fingerprint scan of digits of the user. The measurement module 220 may store the first fingerprint scan as part of the user profile 250. Additionally or alternatively, the decision module 225 may train the machine learning model 260 further based upon the first fingerprint scan. For instance, the decision module 225 may convert the first fingerprint scan into first values that can be used to train the machine learning model 260 (in addition to the first measurements described above). During the second time period, the fingerprint scanner generates a second fingerprint scan of the digits of the user. The decision module 225 may utilize the second fingerprint scan (in addition to the second measurements described above) to identify the user as being authorized to access the vehicle 100. For instance, the decision module 225 may convert the second fingerprint scan into second values that are provided as input to the machine learning model 260 (in addition to the second measurements described above).

It is contemplated that the vehicle access system 170 may utilize additional vehicle entry means in addition to those described above. In an example, decision module 225 mistakenly fails to identify the user as being authorized, the decision module 225 may rely on conventional approaches to grant the user access to the vehicle 100, such as wireless entry through a key fob, a mechanical key, and/or a passcode.

According to embodiments, the decision module 225 may utilize data obtained from the rotation sensors 324, the temperature sensors 325, the optical sensors 326, the camera 327 and/or the miscellaneous sensors 328 in determining whether or not the user is authorized to access the vehicle 100.

Figure 10:
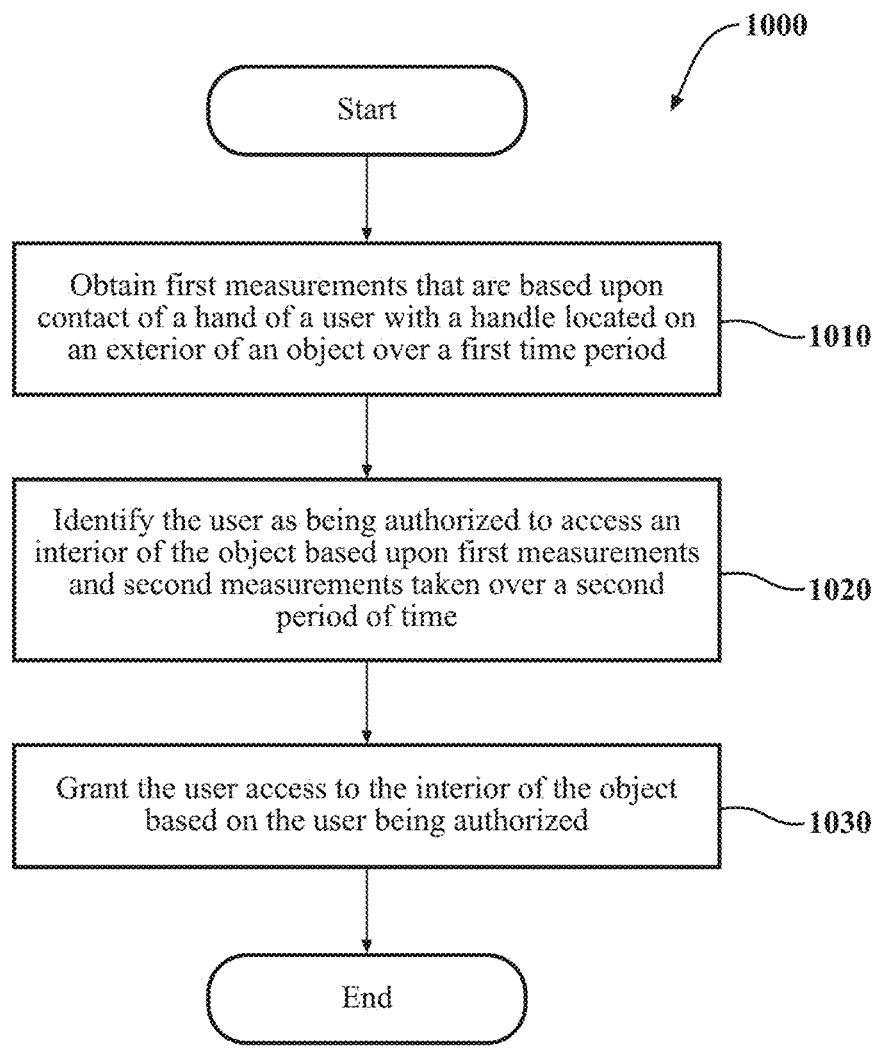
FIG. 10 illustrates one embodiment of a method that is associated with controlling access to an interior of an object.

Additional aspects of controlling access to an interior of an object, such as a cabin of a vehicle, based upon proprioception-related factors will be discussed in relation to FIG. 10. FIG. 10 illustrates a flowchart of a method 1000 that is associated with controlling access to an interior of an object. The method 1000 will be discussed from the perspective of the vehicle access system 170 of FIGS. 1, and 2. While method 1000 is discussed in combination with the vehicle access system 170, it should be appreciated that the method 1000 is not limited to being implemented within the vehicle access system 170 but is instead one example of a system that may implement the method 1000.

At 1010, the vehicle access system 170 obtains first measurements that are based upon contact of a hand of a user with a handle located on an exterior (e.g., a door) of an object (e.g., a vehicle) over a first time period as the hand applies first force to the handle. The measurements may include static characteristics and/or dynamic characteristics as described above.

At 1020, the vehicle access system 170 identifies the user as being authorized to access an interior (e.g., a cabin or a trunk) of the vehicle based upon second measurements. The second measurements are based upon contact of the hand of the user with the handle over a second time period as the hand applies second force to the handle. The second measurements may include the static characteristics and/or dynamic characteristics (taken during the second time period) as described above. The second time period occurs prior to the first time period.

At 1030, the vehicle access system 170 grants the user access to the interior (e.g., the cabin or the trunk) of the object (e.g., the vehicle) based on the user being authorized. For instance, the vehicle access system 170 may unlock the door of the vehicle such that the user may enter the vehicle 100. In an example, the vehicle access system 170 grants the user access to the interior of the object responsive to the user being authorized. In another example, the vehicle access system 170 grants the user access to the interior of the object after a period of time elapses.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110 and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the measurement module 220, the decision module 225, or the vehicle access module 230. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Python, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for controlling access to an interior of an object, the system comprising:
   a processor; and
   memory communicably coupled to the processor and storing instructions that, when executed by the processor, cause the processor to:
   obtain first measurements that are based upon contact of a hand of a user with a handle located on an exterior of the object over a first time period as the hand applies a first force to the handle, the first measurements including static characteristics and dynamic characteristics quantifying an extent of the first force, including grip pressure, orientation, and pulling force, the first measurements uniquely characterizing the user without using a fingerprint;
   identify the user as being authorized to access the interior of the object based upon the first measurements and a profile for the handle, the profile comprising second measurements that are based upon contact of the hand of the user with the handle over a second time period as the hand applies second force to the handle, wherein the second time period occurs prior to the first time period; and
   grant the user access to the interior of the object based on the user being authorized.

2. The system of claim 1, wherein the instructions that cause the processor to grant the user access to the interior of the object comprise instructions that cause the processor to unlock a lock comprised by the object.

3. The system of claim 1, wherein the object comprises a vehicle, wherein the handle is comprised by a door of the vehicle, and wherein the interior comprises a cabin of the vehicle.

4. The system of claim 1, wherein the first measurements comprise a first measurement generated at a first timestep in the first time period and a second measurement generated at a second timestep in the first time period.

5. The system of claim 1, wherein the instructions that cause the processor to identify the user as being authorized to access the interior of the object based upon the first measurements and the profile for the handle comprise instructions to:
   access a machine learning model, wherein the machine learning model includes learned parameters that are based upon the second measurements;
   provide the first measurements as input to the machine learning model; and
   obtain a value as output of the machine learning model, wherein the value is based upon the first measurements and the learned parameters, wherein the user is identified as being authorized to access the interior of the object based upon the value.

6. The system of claim 1, wherein the first measurements comprise one or more of:
   angles at which the handle is pulled by the hand of the user over the first time period;
   gripping pressures applied to different regions of the handle by the hand of the user over the first time period, including changes of the gripping pressures over the first time period;
   pulling forces applied to the different regions of the handle by the hand of the user over the first time period; or
   overall pulling forces applied to the handle by the hand of the user over the first time period.

7. The system of claim 1, wherein the first measurements and the second measurements are generated by a piezoelectric sensor integrated with the handle.

8. The system of claim 1, wherein the instructions further cause the processor to:
   prior to obtaining the first measurements, obtain the second measurements as the user applies the second force to the handle over the second time period as part of a calibration procedure for the handle.

9. A non-transitory computer-readable medium for controlling access to an interior of an object and including instructions that, when executed by a processor, cause the processor to:
   obtain first measurements that are based upon contact of a hand of a user with a handle located on an exterior of the object over a first time period as the hand applies first force to the handle, the first measurements including static characteristics and dynamic characteristics quantifying an extent of the first force, including grip pressure, orientation, and pulling force, the first measurements uniquely characterizing the user without using a fingerprint;
   identify the user as being authorized to access the interior of the object based upon the first measurements and a profile for the user, wherein the profile comprises second measurements that are based upon contact of the hand of the user with the handle over a second time period as the hand applies second force to the handle; and
   grant the user access to the interior of the object based on the user being authorized.

10. The non-transitory computer-readable medium of claim 9, wherein the object is a building, and wherein the handle is located on a door of the building.

11. The non-transitory computer-readable medium of claim 9, wherein the processor is comprised by a server computing device, wherein the object comprises a vehicle and the interior comprises a cabin of the vehicle, wherein the handle is comprised by a door of the vehicle, wherein the instructions that cause the processor to obtain the first measurements comprise instructions that cause the processor to receive the first measurements by way of a network from the vehicle, wherein the instructions that cause the processor to grant the user access to the interior of the object based on the user being authorized comprises comprise instructions that cause the processor to transmit a signal to the vehicle by way of the network which causes the door to unlock.

12. The non-transitory computer-readable medium of claim 9, wherein the instructions further cause the processor to:
   obtain a fingerprint scan of the user during the first time period as the hand applies the first force to the handle; and
   access a stored fingerprint scan of the user, wherein identify the user as being authorized to access the interior of the object is further based upon the fingerprint scan of the user and the stored fingerprint scan of the user.

13. The non-transitory computer-readable medium of claim 9, wherein the first measurements comprise a first measurement that is indicative of a first pressure applied to a first region of the handle by a first digit of the hand of the user at a first timestep during the first time period and a second measurement that is indicative of a second pressure applied to a second region of the handle by a second digit of the hand of the user at the first timestep.

14. The non-transitory computer-readable medium of claim 13, wherein the instructions further cause the processor to:
   compute a ratio between the first measurement and the second measurement, wherein identify the user as being authorized to access the interior of the object is based upon the ratio.

15. A method, comprising,
   obtaining first measurements that are based upon contact of a hand of a user with a handle located on an exterior of an object over a first time period as the hand applies first force to the handle, the first measurements including static characteristics and dynamic characteristics quantifying an extent of the first force, including grip pressure, orientation, and pulling force, the first measurements uniquely characterizing the user without using a fingerprint;
   identifying the user as being authorized to access an interior of the object based upon the first measurements and second measurements, wherein the second measurements are based upon contact of the hand of the user with the handle over a second time period as the hand applies second force to the handle; and
   granting the user access to the interior of the object based on the user being authorized.

16. The method of claim 15, wherein the first measurements comprise a first measurement that is indicative of a first pressure applied by a digit of the hand of the user at a first timestep in the first time period and a second measurement that is indicative of a second pressure applied by the digit of the hand of the user at a second timestep in the first time period.

17. The method of claim 15, wherein the handle is comprised by a door of a vehicle, wherein the first measurements are obtained when the handle is moved from a rest position to a first position while being gripped by the hand of the user, wherein the user is identified as being authorized to access the interior of the object when the handle is at the first position, and wherein the door is unlocked when the handle is moved from the first position to a second position while being gripped by the hand of the user.

18. The method of claim 15, wherein the first measurements are stored in an N by M array, where N is a number of sensors that generated the first measurements and M is a number of timesteps during which the first measurements are generated by the sensors.

19. The method of claim 15, wherein the hand of the user causes a depression on a surface of the handle, wherein an electric signal is generated based upon the depression, and wherein the first measurements are generated based upon the electrical signal.

20. The method of claim 15, wherein identifying the user as being authorized to access the interior of the object based upon the first measurements and the second measurements comprises compare the first measurements to the second measurements, and wherein the user is authorized when one or more of the first measurements are within a threshold range of one or more of the second measurements, respectively.

\* \* \* \* \*